United States Patent [19]

Prakasa

[11] Patent Number: 5,662,026
[45] Date of Patent: Sep. 2, 1997

[54] CLIP SYSTEM FOR COOKWARE

[75] Inventor: Alim Prakasa, Surabava, Indonesia

[73] Assignee: P.T. Maspion, Indonesia

[21] Appl. No.: 456,827

[22] Filed: Jun. 1, 1995

[51] Int. Cl.⁶ ............................. A47J 27/00; B23P 19/04
[52] U.S. Cl. ................. 99/413; 99/403; 220/4.03; 220/8; 220/912; 29/453; 29/458; 126/373
[58] Field of Search ................. 99/410, 413, 403; 126/373; 220/4.03, 4.26, 8, 912; 29/453, 458

[56] References Cited

U.S. PATENT DOCUMENTS

| | | | |
|---|---|---|---|
| 848,698 | 4/1907 | Smith | 220/4.03 |
| 1,482,425 | 2/1924 | Ziony | 220/8 |
| 2,188,563 | 1/1940 | Anzalone . | |
| 2,438,434 | 3/1948 | Friedman | 220/8 |
| 2,546,452 | 3/1951 | Kmieliauskas . | |
| 2,552,702 | 5/1951 | Woolfolk | 220/4.03 |
| 4,222,493 | 9/1980 | Friedman . | |
| 4,604,989 | 8/1986 | Kita . | |
| 4,880,951 | 11/1989 | Levinson | 99/DIG. 14 X |
| 5,016,772 | 5/1991 | Wilk . | |

*Primary Examiner*—Reginald Alexander
*Attorney, Agent, or Firm*—Banner & Witcoff, Ltd.

[57] ABSTRACT

A novel clip system for cookware is disclosed relating to a cooking utensil having a first portion and a second portion which are easily and securely joined together to form a unitary body. The first portion of the cookware utensil has a lip configured to cooperate with a lip on a second portion of the cookware utensil to prevent relative movement of the first portion in a first axial direction. The second portion has at least one stopper to cooperatively engage the lip of the first portion so as to inhibit relative movement of the first portion in a second axial direction. The lip and stopper configuration thereby provides an efficient and cost-effective means for securing the first portion into locking engagement with the second portion to form a unitary body.

21 Claims, 1 Drawing Sheet

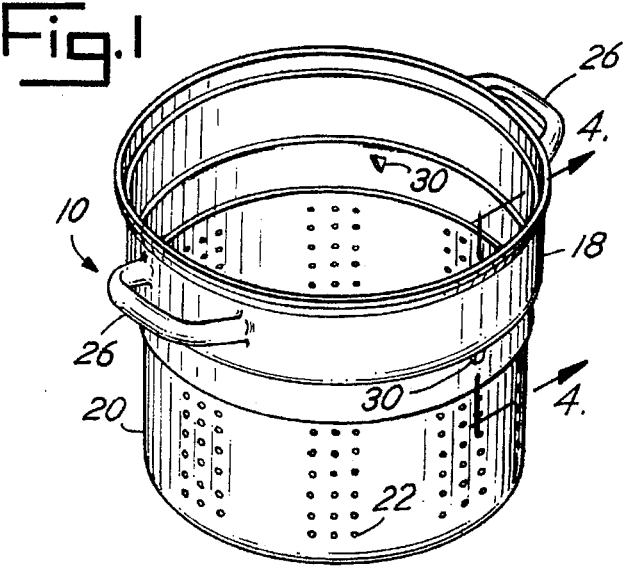
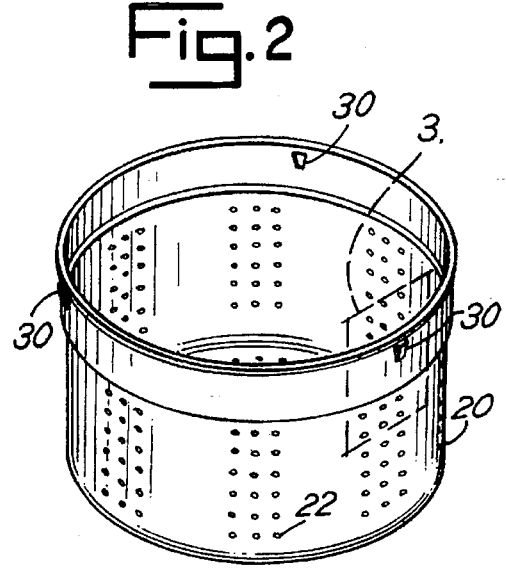
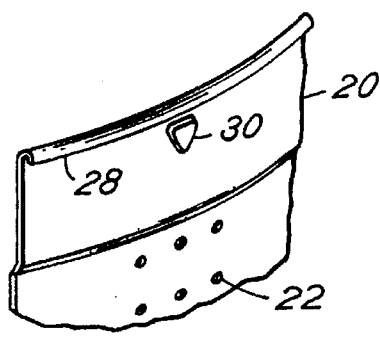
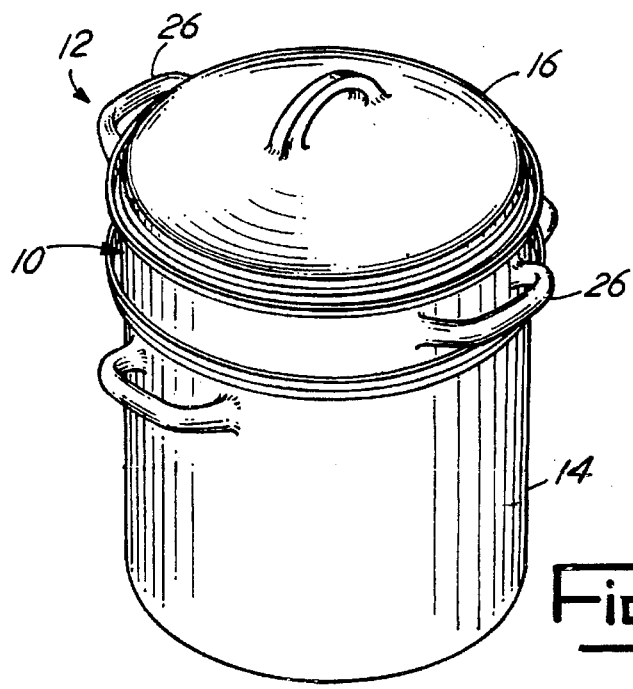

5,662,026

CLIP SYSTEM FOR COOKWARE

BACKGROUND OF THE INVENTION

The present invention relates to cookware utensils and, more particularly, cookware utensils that are manufactured to form a unitary body.

The use of a single continuous piece of material to construct a cookware utensil imposes certain design constraints on the cookware manufacture. The cookware manufacture is limited, for example, to the particular characteristics associated with the selected material. Carbonized steel, for instance, bonds well with enamel coatings and may therefore be easily treated with a colored enamel coating to provide a smooth and attractive finish to the cookware. Carbonized steel, however, is also prone to corrosion. Therefore, a cooking utensil constructed from a single piece of carbonized steel may be susceptible to corrosion where the enamel coating chips and exposes the underlying carbon steel. Indeed, conditions similar to these can occur in an enamel-coated pasta cooker insert if, for example, the edges of the water flow apertures on the basket portion of the insert are not completely coated with enamel during the manufacturing process.

Circumstances such as these may sometimes lead a manufacturer to instead construct the cookware utensil from a stainless steel material, which resists corrosion. A design choice of this sort, however, can be a trade-off, insofar as enamel coatings do not bond well to stainless steel.

For these and other reasons it is often desirable to manufacture a cooking utensil from separate pieces rather than from a single continuous piece of material. This can result in a greater flexibility in cookware design. Such an alternative, however, requires a practical means for assembling and securing the various components together in a secure and cost-effective manner.

It is therefore an object of the present invention to provide a unitary cooking utensil that may be assembled from two or more separate pieces in a secure and cost-effective manner.

It is also an object of the present invention to provide an efficient method for constructing a unitary cooking utensil that may be assembled quickly, easily, and securely.

SUMMARY OF THE INVENTION

These and other important objects are met by the clip system of the present invention. The inventive clip system relates to a cookware utensil having at least two distinct pieces or portions which are to be easily and securely joined together to form a unitary body. A first portion of the cookware utensil has a lip configured to cooperate with a lip on a second portion of the cookware utensil to prevent relative movement of the first portion in a first axial direction. The second portion has at least one stopper to cooperatively engage the lip of the first portion so as to inhibit relative movement of the first portion in a second axial direction. Accordingly, once the lip and stopper of the second portion appropriately engages the lip of the first portion, the first portion is inhibited from any axial movement relative to the second portion, and the two portions are thereby securely joined to one another to form a unitary body.

BRIEF DESCRIPTION OF THE DRAWING

A preferred embodiment of the present invention is described herein with reference to the drawing wherein:

FIG. 1 is a perspective view of a pasta cooker insert illustrating one embodiment of the present invention;

FIG. 2 is a perspective view of the basket portion of the pasta cooker insert shown in FIG. 1;

FIG. 3 is a perspective view of a section of the basket portion shown in FIG. 2;

FIG. 4 is a cross-sectional view of a section of the pasta cooker insert shown in FIG. 1; and FIG. 5 is a perspective view of a complete pasta cookware set, including a pot, the insert of FIG. 1 nested within the pot, and a lid positioned on top of the insert.

DESCRIPTION OF THE PREFERRED EMBODIMENT

While it will be readily apparent to those of ordinary skill in the art that the present invention may be employed in connection with a wide variety of cookware utensils, there is shown in the figures one embodiment of the present invention in the form of a pasta cooker insert 10. A complete pasta cookware set 12 is shown in FIG. 5, which includes a pot 14, an insert 10 nested within the pot 14, and a lid 16 positioned on top of the insert 10. The unnested portion of the insert 10, between the pot 14 and the lid 16, is the collar portion 18 of the insert 10. The pot 14, collar 18, and lid 16 are manufactured from carbonized steel and treated with a colored enamel coating to provide a smooth and attractive finish to the cookware set 12.

The insert 10 of the pasta cookware set 12 is shown in greater detail in FIG. 1. The insert 10 includes a collar 18 and a basket 20 which are joined together to form a unitary body. In a typical use of the pasta cookware set 12, water is introduced into the pot 14 and brought to a boil. The insert 10 is placed within the pot 14. The basket 20 portion of the insert 10 is thereby immersed in the water and pasta may be placed within the insert 10 to cook. Water freely passes in and out of the basket 20 through apertures 22 in the wall of the basket 20. The insert 10 is removed from the pot 14 once the pasta is sufficiently cooked. Water drains from the basket 20 upon removal of the insert 10 from the pot 14 to thereby quickly and easily separate the cooked pasta from the water.

The collar 18 portion of the insert 10 of the preferred embodiment is manufactured from carbon steel. Conventional stamping techniques are used to form the carbonized steel into a generally circular, ring-like piece having an open upper end and an open bottom end. A lip 24 in the form of an integral flange around the bottom end of the collar 18 is formed by stamping the collar 18 in a conventional manner to curve the edge to project radially inward towards a center axis of the collar 18, as is best shown in FIG. 4. It will be readily apparent to those of ordinary skill in the art that the lip 24 disclosed herein may be modified without departing from the true spirit and scope of the present invention. Two handles 26 are welded on opposing sides of the collar wall. The collar 18, like the pot 14 and the lid 16, is then cleaned and dipped in liquid enamel to provide a smooth, durable, and attractive finish.

The basket 20 portion of the insert 10 in the preferred embodiment is manufactured from stainless steel. Conventional stamping techniques are used to form the stainless steel into a generally cylindrical receptacle having an open upper end and a closed bottom end. A plurality of water flow apertures 22 are punched in a conventional manner in the side wall of the basket 20 to permit passage of water in and out of the insert 10.

A lip 28 in the form of an integral flange around the upper end of the basket 20 is formed by stamping the basket 20 in a conventional manner to curve the edge of the basket 20 to project radially outward away from a center axis of the basket 20, as is best shown in FIGS. 3 and 4. The basket 20 of the preferred embodiment, unlike the collar 18, the pot 14 and the lid 16, need not be treated with an enamel coating. The basket 20 is stainless steel, which inherently resists corrosion, and need not aesthetically match the other cookware components, as the basket 20 is hidden from view when the pasta cookware set 12 is assembled as a set, as is shown for example in FIG. 5.

Three stoppers 30 are established on the side wall of the basket 20. The stoppers 30 are located equidistant from one another around the outer circumference of the basket 20. As is best shown in FIGS. 2, 3 and 4, the stoppers 30 in the preferred embodiment are fixed integral protrusions of the basket 20 side wall which are formed by stamping the side wall of the basket 20 such that the protrusions extend radially outward from a center axis of the basket 20. The stoppers 30 are also appropriately spaced from upper edge of the basket 20 so that the stopper 30 can engage the lip 24 of the collar 18 to secure the lip 24 into locking engagement with the lip 28 of the basket 20, as shown in FIG. 4.

The collar 18 and basket 20 portions are assembled together to form a unitary body by passing the basket 20 through the collar 18. In particular, the bottom end of the basket 20 is passed first into the open top end of the collar 18, then through the collar 18, and then out the bottom end of the collar 18. As the process continues and the top edge of the basket 20 passes through the collar 18 and approaches the bottom edge of the collar 18, the close-fitting relationship between the basket 20 and the collar 18 requires the application of an appropriate force to cause the collar 18 and/or basket 20 to yield sufficiently for the lip 24 of the collar 18 to pass over the stoppers 30 on the basket 20. Once the lip 24 of the collar 18 passes over the stoppers 30, the lip 24 of the collar 18 and the lip 28 of the basket 20 naturally nestle into a cooperative locking relationship, as is best shown in FIG. 4, whereby the basket 20 is no longer capable of passing any further through the collar 18.

The stoppers 30 preferably have a slope and notch configuration to facilitate upward passage of the collar 18 over the stopper 30 during assembly, and to inhibit downward passage of the collar 18 over the stopper 30 once the collar 18 and basket 20 portions are assembled. The stoppers 30 thereby engage the bottom edge of the collar 18 so as to prevent the basket 20 and collar 18 from separating from one another after assembly. The collar 18 and basket 20 are thereby secured to one another to form a unitary body. The two joined portions 18 and 20 can be disassembled, if desired, through a careful application of forces on the insert 10 to cause the lip 24 of the collar 18 to overcome the locking force applied by the stoppers 30. Once this occurs, the collar 18 can pass over the stoppers 30 and the two portions 18 and 20 may thereby be separated from one another.

Although certain embodiments of the invention have been described and illustrated herein, it will be readily apparent to those of ordinary skill in the art that a number of modifications and substitutions can be made to the clip system disclosed and described herein without departing from the true spirit and scope of the invention.

I claim:

1. A cookware utensil comprising:
   a first portion having an integral lip formed at an open lower end of said first portion and projecting radially inward towards a center axis of said first portion; and
   a second portion having an integral lip formed at an open upper end of said second portion and projecting radially outward away from a center axis of said second portion, said second portion also having at least one stamped protrusion integral to said second portion to secure said lip of said first portion into locking engagement with said lip of said second portion, said protrusion being spaced from said lip of said second portion and extending radially outward from said center axis of said second portion.

2. A cookware utensil as set forth in claim 1, wherein said first portion is a carbon steel collar.

3. A cookware utensil as set forth in claim 2, wherein said carbon steel collar is coated with enamel.

4. A cookware utensil as set forth in claim 1, wherein said second portion is a stainless steel basket.

5. A cookware utensil as set forth in claim 1, wherein said first portion is a collar and said second portion is a basket.

6. A cookware utensil as set forth in claim 5, wherein said collar is constructed from a first material and said basket is constructed from a second material different from said first material.

7. A cookware utensil as set forth in claim 1, wherein said first portion is constructed from a first material and said second portion is constructed from a second material different from said first material.

8. A cookware utensil as set forth in claim 7, wherein only one of said first and second portions is coated with enamel.

9. A cookware utensil as set forth in claim 8, wherein one of said first and second portions is constructed from carbon steel and the other of said portions is constructed from stainless steel.

10. A cookware utensil comprising:
    an enamel-coated carbon steel collar having an integral lip formed at an open lower end of said collar and projecting radially inward towards a center axis of said collar; and
    a stainless steel basket having an integral lip formed at an open upper end of said basket and projecting radially outward away from a center axis of said basket, said basket also having at least one stamped protrusion integral to said basket and extending radially outward from the center axis of said basket, said protrusion being spaced from said lip of said basket to secure said lip of said collar into locking engagement with said lip of said basket.

11. A method for manufacturing a cookware utensil having at least a first portion and a second portion, comprising the steps of:
    forming an integral lip at an open lower end of said first portion, said lip projecting radially inward towards a center axis of said first portion;
    forming an integral lip at an open upper end of said second portion, said lip projecting radially outward away from a center axis of said second portion; and
    stamping at least one integral protrusion on said second portion to secure said lip of said first portion into locking engagement with said lip of said second portion, said protrusion being spaced from said lip of said second portion and extending radially outward from said center axis of said second portion.

12. A method for manufacturing a cookware utensil as set forth in claim 11, wherein said first portion is a carbon steel collar.

13. A method for manufacturing a cookware utensil as set forth in claim 12, including the step of coating said carbon steel collar with enamel.

14. A method for manufacturing a cookware utensil as set forth in claim 11, wherein said second portion is a stainless steel basket.

15. A method for manufacturing a cookware utensil as set forth in claim 11, including the step of securing said lip of said first portion into locking engagement with said lip of said second portion.

16. A method for manufacturing a cookware utensil as set forth in claim 11, wherein said first portion is a collar and said second portion is a basket.

17. A method for manufacturing a cookware utensil as set forth in claim 16, wherein said collar is constructed from a first material and said basket is constructed from a second material different from said first material steel.

18. A method for manufacturing a cookware utensil as set forth in claim 11, wherein said first portion is constructed from a first material and said second portion is constructed from a second material different from said first material.

19. A method for manufacturing a cookware utensil as set forth in claim 18, including the step of coating only one of said first and second portions with enamel.

20. A method for manufacturing a cookware utensil as set forth in claim 19, wherein one of said first and second portions is constructed from carbon steel and the other of said portions is constructed from stainless steel.

21. A cookware utensil comprising:

a first portion having an integral lip formed at an open lower end of said first portion and projecting in a first radial direction relative to a center axis of said first portion; and a second portion having an integral lip formed at an open upper end of said second portion and projecting in a second radial direction relative to a center axis of said second portion, said second radial direction being substantially opposite said first radial direction of said first portion, said second portion also having at least one stamped protrusion integral to said second portion to secure said lip of said first portion into locking engagement with said lip of said second portion, said protrusion being spaced from said lip of said second portion and extending in said second radial direction relative to said center axis of said second portion.

\* \* \* \* \*

UNITED STATES PATENT AND TRADEMARK OFFICE
CERTIFICATE OF CORRECTION

PATENT NO. : 5,662,026
DATED : September 2, 1997
INVENTOR(S) : Alim Prakasa

It is certified that error appears in the above-indentified patent and that said Letters Patent is hereby corrected as shown below:

Column 5, Claim 17, line 4 reads "material different from said first material steel." and should read --material different from said first material.--

Signed and Sealed this

Eighteenth Day of November 1997

Attest:

BRUCE LEHMAN

*Attesting Officer*     *Commissioner of Patents and Trademarks*